(12) United States Patent
Yuen et al.

(10) Patent No.: US 11,168,485 B2
(45) Date of Patent: Nov. 9, 2021

(54) LOW COST EMERGENCY HOUSING

(71) Applicant: VBBT Corp, Hartford, CT (US)

(72) Inventors: Yuk-Kwan Brian Yuen, Wethersfield, CT (US); Venesia Hurtubise, Hartford, CT (US); William John Kehoe, Hartford, CT (US); Thomas J Kennedy, III, Wilbraham, MA (US)

(73) Assignee: VBBT Corp., Hartford, CT (US)

(*) Notice: Subject to any disclaimer, the term of this patent is extended or adjusted under 35 U.S.C. 154(b) by 0 days.

(21) Appl. No.: 16/571,068

(22) Filed: Sep. 14, 2019

(65) Prior Publication Data

US 2020/0087939 A1 Mar. 19, 2020

Related U.S. Application Data

(60) Provisional application No. 62/731,865, filed on Sep. 15, 2018.

(51) Int. Cl.
*E04H 1/12* (2006.01)
*C08G 18/64* (2006.01)
(Continued)

(52) U.S. Cl.
CPC ............... *E04H 1/12* (2013.01); *B32B 5/022* (2013.01); *B32B 5/024* (2013.01); *B32B 5/18* (2013.01); *B32B 7/12* (2013.01); *C08G 18/6484* (2013.01); *C08G 18/6492* (2013.01); *E04B 1/34336* (2013.01); *B32B 2255/26* (2013.01); *B32B 2260/021* (2013.01); *B32B 2260/046* (2013.01); *B32B 2305/022* (2013.01); *B32B 2305/024* (2013.01); *B32B 2305/076* (2013.01); *B32B 2607/00* (2013.01); *C08G 2101/00* (2013.01);
(Continued)

(58) Field of Classification Search
CPC .......... E04H 1/12; B32B 5/022; B32B 5/024; E04B 2103/04
See application file for complete search history.

(56) References Cited

U.S. PATENT DOCUMENTS

| | | |
|---|---|---|
| 3,305,991 A | 2/1967 | Weismann |
| 4,731,266 A | 3/1988 | Bonnebat et al. |

(Continued)

FOREIGN PATENT DOCUMENTS

| | | |
|---|---|---|
| CN | 107724709 | 2/2018 |
| CN | 110295767 | 2/2018 |
| WO | WO 2004/111368 | 12/2004 |

OTHER PUBLICATIONS

Simon Robinson, Polyurethane for emergency and prefabricated buildings and construction, Urethanes Technology International (printed Feb. 18, 2020). 10 pages.

(Continued)

*Primary Examiner* — Babajide A Demuren
*Assistant Examiner* — Daniel J Kenny
(74) *Attorney, Agent, or Firm* — UConn IP Law Clinic; Thomas J. Kennedy III; Yuk-Kwan Brian Yuen

(57) ABSTRACT

A low cost and disaster relief housing solution includes the combination of preconstructed in-service or out-of-service shipping containers that are integrated with renewable and sustainable materials to complete the buildout of the shipping containers. The embodiment also includes folding solutions that allows for a superior logistic solution for shipping and site integration.

6 Claims, 5 Drawing Sheets

(51) Int. Cl.
*B32B 5/02* (2006.01)
*B32B 5/18* (2006.01)
*B32B 7/12* (2006.01)
*E04B 1/343* (2006.01)
*C08G 101/00* (2006.01)

(52) U.S. Cl.
CPC .................... *E04B 2103/04* (2013.01); *E04H 2001/1283* (2013.01)

(56) References Cited

U.S. PATENT DOCUMENTS

| | | | |
|---|---|---|---|
| 4,854,094 A * | 8/1989 | Clark | E04B 1/3483 52/79.1 |
| 5,876,534 A | 3/1999 | Erhardt | |
| 6,253,530 B1 | 7/2001 | Price et al. | |
| 6,448,323 B1 | 9/2002 | Jordan et al. | |
| 6,599,455 B2 * | 7/2003 | Wierer | B27N 3/00 264/109 |
| 6,767,623 B1 | 7/2004 | Mock et al. | |
| 7,021,009 B2 | 4/2006 | Johnson | |
| 7,419,031 B2 * | 9/2008 | Liguore | B32B 3/12 181/210 |
| 7,732,032 B2 | 6/2010 | Dubey | |
| 7,736,696 B2 | 6/2010 | Piana et al. | |
| 7,972,669 B2 | 7/2011 | Matsuoka et al. | |
| 8,227,039 B2 * | 7/2012 | Hilken | B32B 9/02 427/326 |
| 8,291,647 B2 | 10/2012 | Esposito | |
| 8,318,827 B2 * | 11/2012 | Taylor | C08G 18/4018 521/173 |
| 8,389,107 B2 | 3/2013 | Riebel et al. | |
| 8,414,905 B2 | 4/2013 | Cech et al. | |
| 8,541,556 B1 | 9/2013 | Gu | |
| 8,557,367 B2 * | 10/2013 | Netravali | B32B 5/026 428/178 |
| 8,617,330 B2 | 12/2013 | Mariezkurrena et al. | |
| 8,728,593 B2 | 5/2014 | Vicari et al. | |
| 9,095,142 B2 | 8/2015 | Gu | |
| 9,096,465 B2 | 8/2015 | Tuttle et al. | |
| 9,193,130 B2 * | 11/2015 | Lee | C08J 5/06 |
| 9,598,529 B2 * | 3/2017 | Langlois | C08G 18/168 |
| 9,631,246 B2 | 4/2017 | Jansen et al. | |
| 10,030,126 B2 * | 7/2018 | Kumar | C04B 20/1051 |
| 2006/0123725 A1 * | 6/2006 | Godwin | B32B 21/14 52/309.11 |
| 2008/0185900 A1 * | 8/2008 | Lee | B29C 44/14 297/452.58 |
| 2011/0162293 A1 * | 7/2011 | Levy | E04B 1/3483 52/79.9 |
| 2013/0291450 A1 | 11/2013 | Hillje | |
| 2014/0033627 A1 * | 2/2014 | Stephens, Jr. | E04C 2/28 52/204.5 |
| 2014/0162038 A1 | 2/2014 | Riebel et al. | |
| 2014/0123574 A1 | 5/2014 | Paone et al. | |
| 2014/0318069 A1 * | 10/2014 | Moennig | E04B 1/762 52/511 |

OTHER PUBLICATIONS

Sakakura, T. Choi, J-C & Yasuda, H., Copolymerization of carbon dioxide and butadienevia a lactone intermediate, Nature Chemistry (Mar. 9, 2004). 7 pages.
Bayer MaterialScience CO2-to-Plastics Pilot Plant, Chemicals Technology (printed Feb. 22, 2020). 3 pages.
S. Siti Suhaily, H.P.S. Abdul Khalil, W.O. Wan Nadirah & M. Jawaid, Bamboo Based Biocomposites Material, Design and Applications (2013). 30 pages.
bettershelter.org, About Us : Better Shelter (printed Feb. 18, 2020) https://bettershelter.org/about/. 3 pages.
bettershelter.org, Better Shelter Unit 1.0—Product Specification (printed Feb. 22, 2020). 1 page.
J.H. Song, R.J. Murphy, R. Narayan & G.B.H. Davies, Biodegradable and compostable alternatives to conventional plastics, Phil. Trans. R. Soc. B (2009). 13 pages.
Ling Dong, Yu Wang, Hong Xian Li, Boya Jiang & Mohamed Al-Hussein, Carbon Reduction Measures-Based LCA, Sustaiability (Mar. 6, 2018). 22 pages.
Nyflött, Å., Meriçer, Ç., Minelli, M. et al. The influence of moisture content on the polymer structure of polyvinyl alcohol in dispersion barrier coatings and its effect on the mass transport of oxygen. J Coat Technol Res 14, 1345-1355 (2017), 11 pages.
Chai, W., Chow, J., Chen, C. et al. Evaluation of the Biodegradability of Polyvinyl Alcohol/Starch Blends: A Methodological Comparison of Environmentally Friendly Materials. J Polym Environ 17, 71 (2009). https://doi.org/10.1007/s10924-009-0123-1, 12 pages.
Gorrasi, G., Pantani, R. "Hydrolysis and Biodegradation of Poly(Lactic Acid)" Advances in Polymer Science, vol. 279, 2018, pp. 119-151.
Wilfred, O., Tai, H., Marriott, R., Liu, Q., Tverezovskiy, V., Curling, S., Fan, Z., & Wang, W. (2018). Biodegradation of Polylactic Acid and starch composites in compost and soil. International Journal of Nano Research, 1(2), 1-11, 12 pages.
Khazabi, M., Gu, R., & Sain, M. (2011). Fiber reinforced soy-based polyurethane spray foam insulation. Part 1: Cell morphologies. BioResources, 6(4), 3757-3774.
Borowicz, M., Paciorek-Sadowska, J., Lubczak, J., & Czuprynki, B. (2019). Biodegradable, Flame-Retardant, and Bio-Based Rigid Polyurethane/Polyisocyanurate Foams for Thermal Insulation Application. Polymers, 11(11), 1816. https://doi.org/10.3390/polym11111816, 24 pages.
Winandy et al, Emergency Housing Systems from Three-Dimensional Engineered Fiberboard, USDA, Apr. 2006, 14 pages.
Keller, T., FRP Sandwich Structures in Bridge and Building Construction, Swiss Federal Institute of Technology Lausanne, EPFL, Composite Construction Laboratory, CCLab, Dec. 2016, 6 pages.
Mathijsen, D. Composite Sandwich Structures: The New Milestone in Bridge Building, Reinforced Plastics, Nov./Dec. 2013, 17 pages.
Edited by Mottram et al., Fibre-Reinforced Polymer Bridge—Guidance for Designers, CIRIA, Composites UK, 2018, 156 pages.

* cited by examiner

LOW COST EMERGENCY HOUSING

BACKGROUND

A housing crisis exists worldwide where the need for low cost and easily transported and placed housing has become critical. Also, climate change has caused more destructive storms which have increased the need for emergency housing. There is therefore a need for easily deployable, low cost housing solutions that are logistically superior to the current housing deployment solutions and that do not impact the environment once their use is terminated.

Current housing solutions, including the reuse of shipping containers, have several disadvantages. These include the following: 1. The cost of the units where the build out of the units can push the cost close to $100,000, 2. Logistics where transportation and site location can cause significant challenges, 3. The aftermath of disaster relief efforts where the residual, used housing can cause a significant environmental issue, 4. The absence of sustainable and renewable material in the build out of the housing solutions, 5. The lack of standardized intercommunicability of the housing units as well as service interfaces such as water, electrical and electronic, and 6. The absence of build-in-place systems.

Therefore, a new low cost and easily deployable housing solution is desired to both alleviate the housing crisis and to offer improved aid in disaster relief efforts.

SUMMARY

The present disclosure relates, in various embodiments, to new technologies that are available for low cost and disaster relief housing.

One aspect of the new technology is comprised of the ability to fold shipping containers flat for shipping and then restoring the units to a 3D configuration through the use of smart folding technology, utilizing elastomeric joints and hardened connectors. This configuration allows greatly improved and rapid deployment of the housing solutions. Elastomeric joints may be thermoplastic or thermoset such as thermoplastic polyurethanes or cross-linked cis-poly isoprene rubber. The hardened connectors may be case hardened steels, composite connectors or other types of viable materials that would be utilized in a connector or pinion or bolt.

A further embodiment is the use of renewable and sustainable materials for the build out of the shipping containers and, eventually, production of the containers themselves. Materials may include the use of high amylose starch based wall boards and sucrose based polyurethane foam for insulation, sound proofing, structural integrity and aesthetics.

The starch based wall boards are composed of a high amylose starch which may also be mixed gypsum and other fillers. The wallboards are coated with high molecular weight polyvinyl alcohol coatings and acrylic coating combinations which protect the wall boards while in use but may be scored after the useful life of the material has been reached to accelerate natural decomposition and composting of the wallboards.

One of the great aspects of shipping containers is the ability to stack the containers. This aspect of the shipping containers, however, is not needed for a single level housing solution. Structural integrity may be maintained by a combination of metal stringers and sucrose based polyurethane foam injected into the interstitial spaces to tie the system together. The frames of existing shipping containers may be utilized but the system also lends itself to a primary construction production.

The sucrose based polyurethane foam may be blown with gas, such as pentane, but may also be blown with water where the water reacts with the polyisocyanate to form polyurea and carbon dioxide that is encased in the foam as it is blown up to 20 times its volume. The polyurethane foam may also have fire retardant materials such as sodium borate (borax), aluminum trihydrate and other fire resistant materials.

Sandwich construction may also be utilized to manufacture components of the low cost and disaster relief housing solutions. For sandwich construction, typically there is a stiff outer layer, many times known as the face sheet, that is adhered to both sides of a honeycomb or foamed or low density interior portion where the adhesion is accomplished by a thin layer of adhesive or glue. The adhesion may also be achieved by having like materials adhere to each other such as a styrene modified polyester resin adhering to a styrene containing foam. The sandwich construction here may be composed of renewable, recyclable, or biodegradable materials. For instance, interior honeycomb or foam may be a starch based material that will degrade upon exposure to enzymatic processes, sunlight, moisture, and the like.

One embodiment described herein is a system comprising a framework and a plurality of structural components, wherein the combination of the framework and the structural components form a part of a housing construction, wherein the framework is comprised of in-service or out-of-service shipping containers, and wherein the structural components are comprised of renewable and sustainable materials and are recyclable or compostable. In embodiments, the structural materials comprise at least one of starch integrated wall board and sucrose based polyurethane foam. In some cases, the structural materials comprise at least one of lignin-based polyurethane resins and lignin-based polyurethane foams. In embodiments, the framework comprises metal stringers and foam-in-place material.

A further embodiment is a system comprising a framework and a plurality of structural components, wherein the combination of the framework and the structural components form a part of a housing construction. The framework is comprised of shipping containers, and at least a portion of the structural components are formed from compostable materials. In embodiments, the structural materials comprise at least one of starch integrated wall board and sucrose based polyurethane foam. In some cases, the structural materials comprise at least one of lignin-based polyurethane resins and lignin-based polyurethane foams. In embodiments, the framework comprises metal stringers and foam-in-place material.

Another embodiment is a system comprising a light weight core material and a facing material formed on the light weight core material, wherein the facing material comprises a filamentous woven or non-woven material and a polymeric resin material, and the polymeric resin material is infused into the filamentous woven or non-woven material. In embodiments, the system comprises a framework and a plurality of structural components, wherein the combination of the framework and the structural components form a part of a housing construction, wherein the framework is comprised of in-service or out-of-service shipping containers, and wherein at least a portion of the structural components comprise compostable material.

Yet another embodiment is a method of making the system described in the previous paragraph.

A further embodiment is a method of forming a sandwich construction wherein the exterior faces are formed first and the interior lightweight material is formed in situ between the exterior faces to form a continuous structure, wherein the interior lightweight material imparts strength to the sandwich construction.

Another embodiment is a product made by the method described in the preceding paragraph. A further embodiment is a foldable housing construction comprising one or more of the systems described above.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

Figure 1:
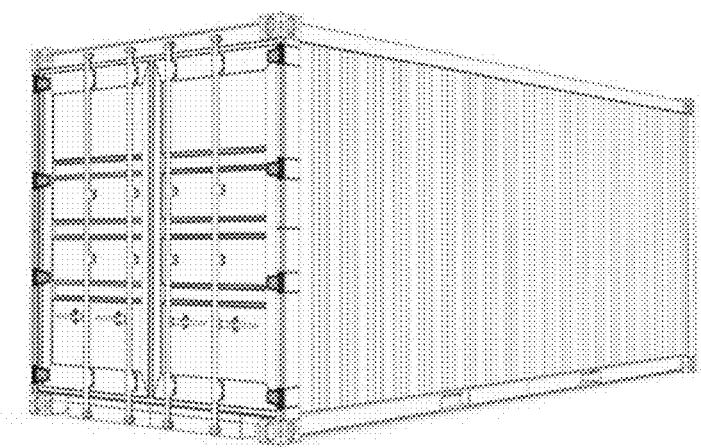
FIG. 1 is an illustration of a conventional shipping container before any modification.

FIG. 1 shows on unadulterated conventional shipping container. The structural integrity of these rectangular boxes is such that they may be stacked six high when shipping. However, the structural integrity is not necessarily a need in low-cost and disaster relief housing.

Figure 2:
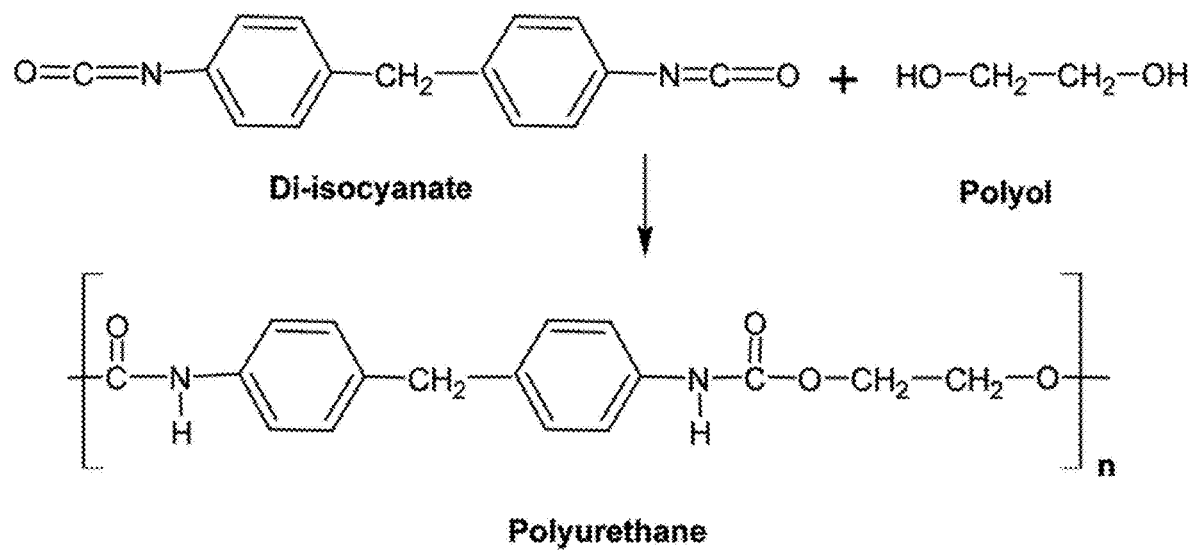
FIG. 2 is stick figure description of the polyurethane reaction.

FIG. 2 is a schematic of the polyurethane reaction, utilizing a polyol and an isocyanate to produce the polyurethane. The focus on the polyol portion of the equation is important from the aspect of renewable materials may be utilized to make these hydroxyl functional polyols. These include sucrose based polyols and concern based polyols. It may also include lignin based polyols.

Figure 3:
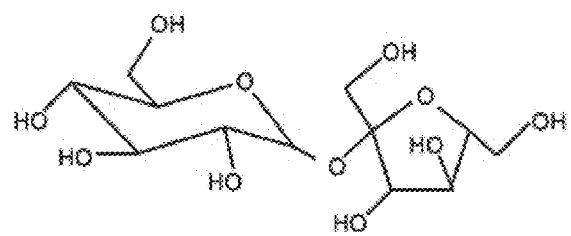
FIG. 3 shows the configuration of a sucrose polyol that can be utilized to make polyurethane foam used in embodiments described herein.

FIG. 3 shows the sucrose polyols that may be substituted into the polyurethane schematic to react with polyisocyanate and form polyurethane. Sucrose is a renewable resource and many sugar operations have other waste streams that may be utilized as a reactive material with polyisocyanates to form polyurethanes.

Figure 4:
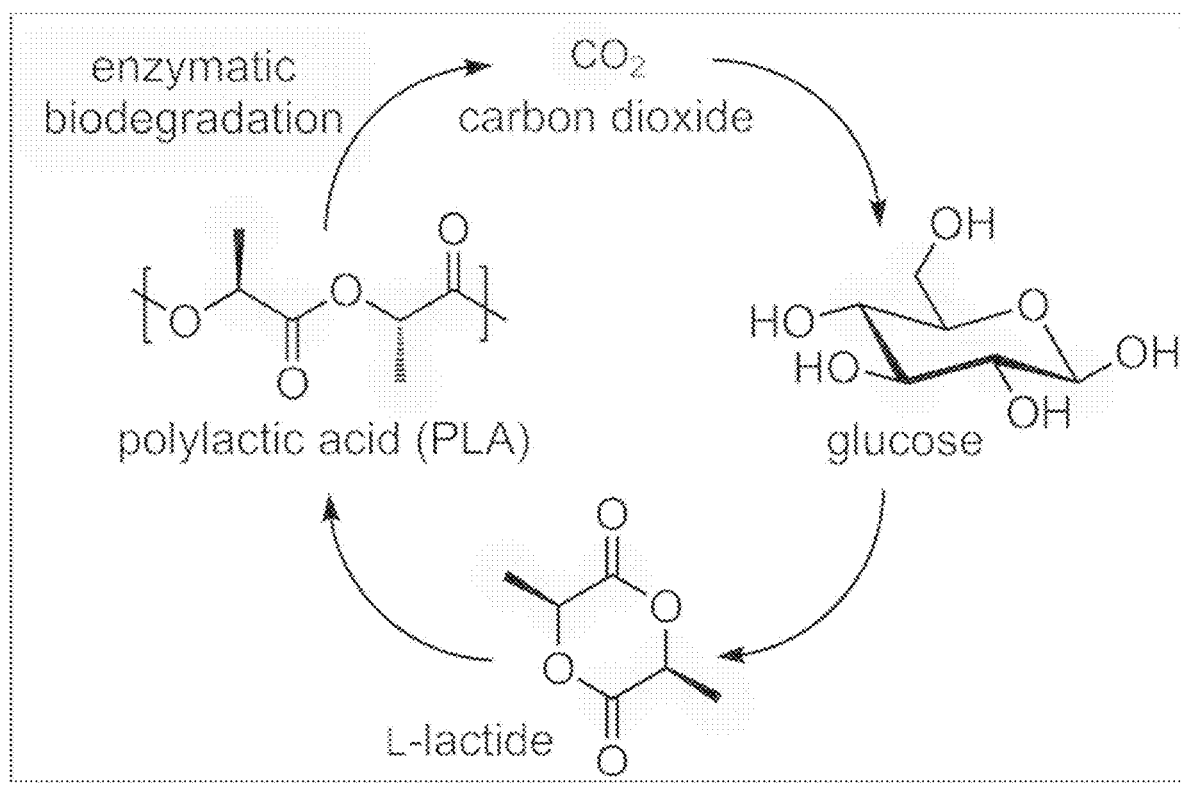
FIG. 4 illustrates the degradation cycles for poly lactic acid.

FIG. 4 shows the degradation cycle of poly lactic acid. Poly lactic acid (PLA) is being utilized more and more in consumer applications where recyclable and renewable processes have not necessarily taken hold and this is an attempt to improve the bio degradation of used plastic.

Figure 5:
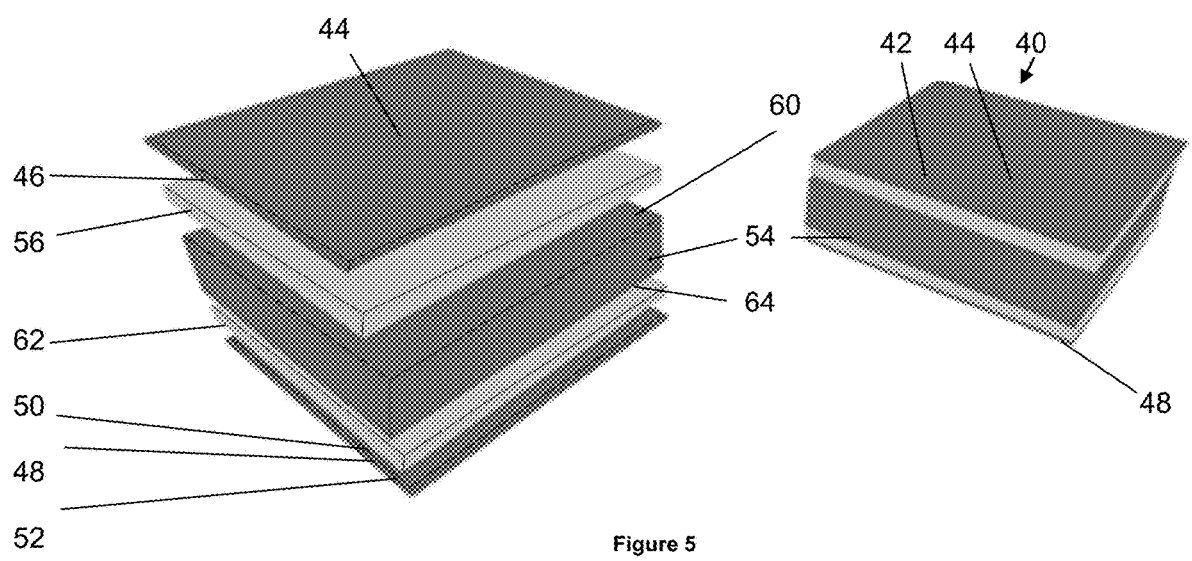
FIG. 5 is a depiction of sandwich construction for embodiments described herein.

FIG. 5 shows an example of the sandwich construction that may be utilized in building out the low cost housing or disaster relief housing. Sandwich construction offers a very high strength in one direction. It may also be utilized to build materials that will biodegrade quicker once the exterior of the component is disrupted or scored or cut.

One of the issues with deployment of emergency housing is in the aftermath of the emergency need or disaster. The housing or shelter units are typically in very poor condition and there is a need for a massive cleanup of the compromised units. As an answer to this problem, a housing or shelter unit that is easily deployed and easily disposed of when no longer needed is a real need especially in the emergency management arena. Another embodiment of this application is a shipping container shell that contains biodegradable buildout materials such as wallboards and furniture. When the need for the emergency and/or disaster shelter or housing is over, the biodegradable interior of the housing unit or shelter may be removed and composted while the external shell of the housing or shelter unit may be crushed. In some embodiments, the entire unit is made of recyclable or biodegradable materials such as reinforced poly lactic acid, starch based building materials and other recyclable, compostable, or renewable materials.

Figure 6:
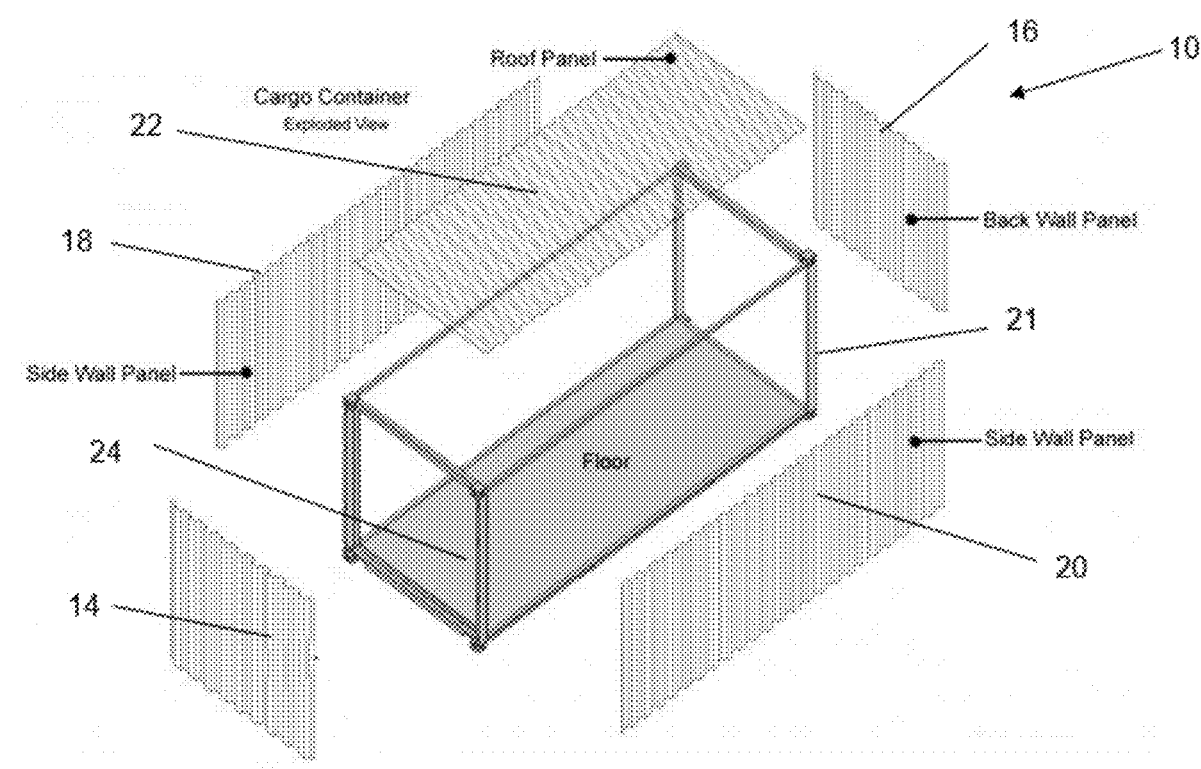
FIG. 6 is an exploded view of a shipping container converted to emergency housing with biodegradable build out components.
Figure 7:
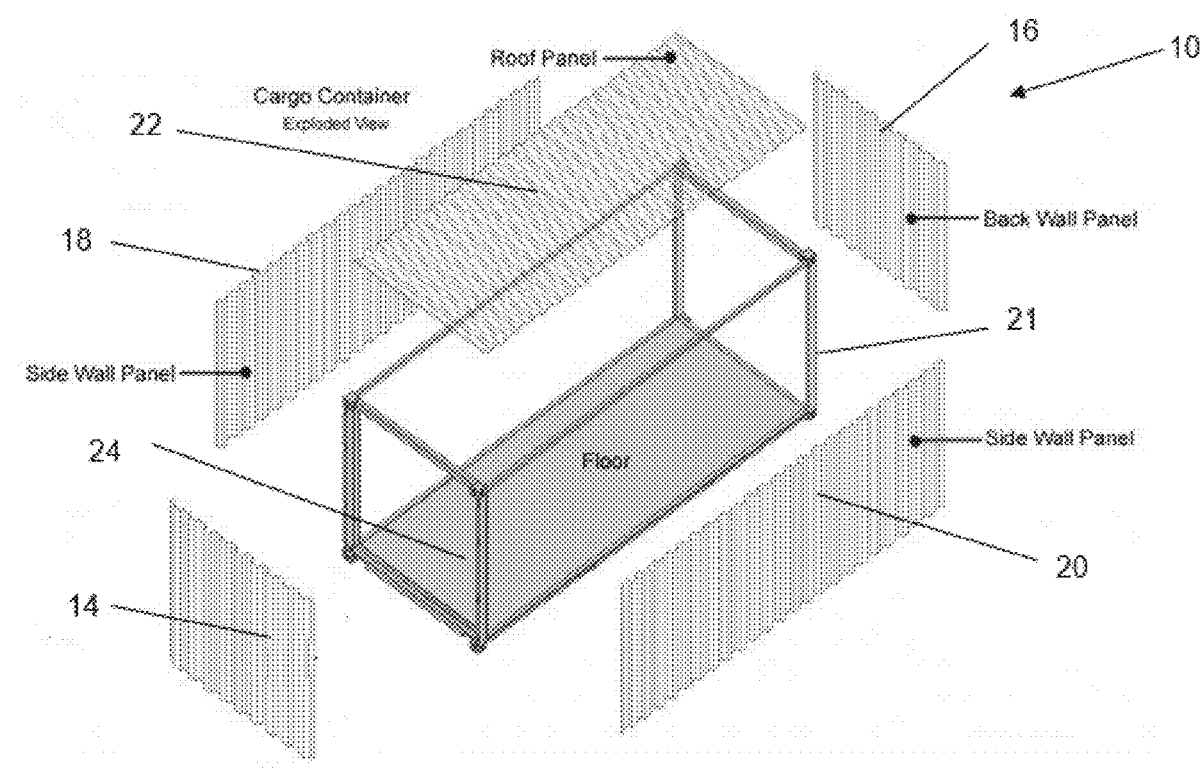

FIG. 6 is an exploded view of a converted shipping container 10 for emergency housing. The exterior components, including an exterior front wall 14, an exterior back wall 16, an exterior first side wall 18, an exterior second side wall 20 that usually is parallel to the first side wall 18, the roof 22 and the floor 24 may be made of structural material such as corrugated steel, aluminum and other recyclable metals. The interior components are formed from compostable and recyclable materials such as poly lactic acid and polyethylene terephthalate, respectively.

In embodiments, one or more of the exterior front wall 14, exterior back wall 16, exterior first side wall 18, exterior second side wall 20, the roof 22 and the floor 24 are made of compostable materials. In these embodiments, a key material is the coating that is on the exterior of the future compostable materials. Environmentally durable coatings such as polyurethanes, specifically polyether and polyester polyurethanes, provide durability, abrasion resistance and self-healing capabilities. Once these coatings are stripped off, the interior components of the structural pieces will be exposed to the environment and thus break down to microbial, UV, hydrolysis, and other environmental factors that will allow degradation of the materials to gases and small molecules. Non-limiting examples of methods to strip off the exterior coatings include scoring the surface of the polymer or otherwise degrading the film integrity so as to allow degradation of the interior components of the composite and start the bio degradation process. The exterior material may also be stripped off with high temperature water or a solvent such as acetone.

The sandwich panel shown in FIG. 5 is generally designed as 40. This panel includes a first face sheet 42 with an exterior side 44 and an interior side 46, a second face sheet 48 with an interior side 50 and an exterior side 52, and a core 54 positioned between the first face sheet 42 and the second face sheet 48. In embodiments, a first adhesive layer 56 connects the first face sheet 42 to a first side 60 of the core 54. In embodiments, a second adhesive layer 62 connects the second face sheet 48 to a second side 64 of the core 54. The core 54 can be formed from a honeycomb material, however, the sandwich panel alternatively or additionally may utilize other materials as the center, filler portion in place of, or in addition to, the honeycomb material. These materials include balsa wood which is a lightweight cellular wood with good strength characteristics. Balsa wood also has excellent shear properties so that the exterior faces of the sandwich construction remain stable with shear forces placed on the structure. The balsa wood core may be a solid monolithic core or it may be divided into different geometric sections so as to conform to the molding process of the exterior faces on the sandwich construction.

The polymeric resin used on the facing material for the sandwich construction may be of various types provided it is biodegradable, similar to the exterior coatings. One type that may be utilized is a soybean derived epoxy system. In embodiments, the epoxy is cured with an amide or amine curative. In some cases, the chemical makeup of the epoxide system is such that it will lend itself to biodegradation with the application of heat, pressure, humidity, and combinations of other environmental factors.

In embodiments, the composite material for the facing materials comprises a natural fiber. Non-limiting examples of suitable natural fibers include sisal, hemp, bamboo, jute, and cotton. In embodiments, the natural fibers are saturated with the soy-based epoxy system and applied to the exterior faces of the balsa or foam core and allowed to cure. This forms a sandwich composite construction that has an excellent combination of mechanical strength, shear resistance, and biodegradation capabilities.

Fastening areas or components may be built into the composite sandwich construction components such that secondary beams, specialty fasteners, and other joining techniques may be utilized to join various composite components to each other. These fastening areas may be as simple as a surface extension on the sandwich construction panels that will accept a crossbeam and thus strengthen the sandwich construction panel and or join it to another sandwich construction panel.

Interfaces between the composite panels may be accomplished through various specialized joints such as a U joint or a H joint. These joints may be made out of thermoplastic or thermoset materials such as thermoset rubber or thermoplastic polyurethane.

In some cases, the interior components of the housing are configured to begin to decompose when exposed to high humidity conditions and/or water that is at standard temperature and pressure or elevated temperature. The exterior coating materials, such as polyvinyl alcohol films, may be modified such that various times for biodegradation may be built into the composite. For instance, a low molecular weight polyvinyl alcohol films will allow faster degradation than will a high molecular weight polyvinyl alcohol film. Copolymers, such as polyvinyl acetate, may also be added to the exterior films, such as polyvinyl alcohol, to change the degradation attributes of the materials.

The various components of the sandwich construction may be tied together with an adhesive, such as a pressure sensitive adhesive that is either thermoplastic or thermoset. In other cases, mechanical fasteners are used in place or, or in addition to the adhesive.

The sandwich construction may also be utilized to make various components of furniture for the low cost emergency housing structures. The various components of the furniture may be incorporated into the structural configuration for the low cost emergency housing. For instance, the seat of a couch made from sandwich construction may be utilized to make part of a wall while the legs of a chair may be utilized as beams to strengthen components of the low cost emergency housing. Fasteners and adhesives may be utilized to incorporate the furniture components into the structural components of the low cost emergency housing.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The invention claimed is:

1. A system comprising:
a light weight core material comprising a combination of a sucrose based polyol,
an isocyanate, and water, forming a foamed polyurethane, and
a facing material formed on the light weight core material, wherein the facing material comprises a filamentous woven or non-woven material and a polymeric resin material comprising a cured soy-based epoxy system, the facing material includes an exterior face having an exterior coating of polyvinyl alcohol, and the polymeric resin material is infused into the filamentous woven or non-woven material.

2. The system of claim 1 wherein the core material further comprises at least one of balsa wood and a non-polyurethane-based foamed polymer.

3. The system of claim 1 wherein the filamentous material comprises at least one member selected from the group consisting of sisal, hemp, bamboo, jute, and cotton.

4. The system of claim 1 wherein the light weight core material is connected to the facing material with an adhesive.

5. The system of claim 4 wherein the adhesive is a pressure sensitive adhesive that is thermoplastic or thermoset.

6. A system comprising:
an exterior housing wall formed from
a light weight core material comprising a foamed poly lactic acid, and
a facing material formed on the light weight core material comprising a filamentous woven or non-woven material and a cross-linked polymeric resin material comprising a poly lactic acid,
wherein the polymeric resin material is infused into the filamentous woven or non-woven material, the facing material includes an exterior face with an exterior layer comprising polyvinyl alcohol, and the system has one or more layers connected to an adjacent layer with a pressure sensitive adhesive.

* * * * *